United States Patent

[11] 3,617,526

| [72] | Inventors | William R. Coons, Jr. |
|---|---|---|
| | | Groves; |
| | | Gerald V. Nelson, Nederland, Tex.; Glenn C. Wray, Dyersburg, Tenn. |
| [21] | Appl. No. | 855,756 |
| [22] | Filed | Sept. 5, 1969 |
| [45] | Patented | Nov. 2, 1971 |
| [73] | Assignee | Texaco Inc. |
| | | New York, N.Y. |
| | | Continuation-in-part of application Ser. No. 689,825, Dec. 12, 1967. |

[54] HYDRODESULFURIZATION OF A VACUUM GAS OIL AND VACUUM RESIDUUM
4 Claims, No Drawings

[52] U.S. Cl....................................................... 208/211, 208/210, 208/216
[51] Int. Cl........................................................C10g 23/00, C10g 23/02
[50] Field of Search............................................ 208/211, 210, 216, 218, 209

[56] References Cited
UNITED STATES PATENTS

| 2,983,676 | 5/1961 | Howland..................... | 208/218 |
| 3,306,845 | 2/1967 | Poll............................. | 208/210 |
| 3,393,148 | 7/1968 | Bertolacini et al........... | 208/216 |
| 3,471,399 | 10/1969 | O'Hara........................ | 208/216 |
| 2,878,179 | 3/1959 | Hennig........................ | 208/210 |

FOREIGN PATENTS

| 264,281 | 5/1963 | Australia..................... | 208/216 |

Primary Examiner—Delbert E. Gantz
Assistant Examiner—G. J. Crasanakis
Attorneys—K. E. Kavanagh, Thomas H. Whaley and Robert Knox, Jr.

ABSTRACT: Hydrodesulfurization of an atmospheric residuum is effected by separating it into a vacuum gas oil and vacuum residuum and desulfurizing the gas oil fraction under less severe conditions than the heavy fraction. The vacuum residuum is contacted initially with a catalyst containing a Group VI metal and Group VIII metal or their sulfides on an alumina support containing 2-4 weight percent silica, a surface area of at least 250 $m^2/g$. and a pore volume of at least 0.6 cc./g.; the effluent from the first zone is mixed with the gas oil fraction and the resulting mixture is then contacted with the catalyst at a lower temperature than the effluent temperature from said first zone.

HYDRODESULFURIZATION OF A VACUUM GAS OIL AND VACUUM RESIDUUM

This application is a continuation-in-part of our copending application Ser. No. 689,825, filed Dec. 12, 1967.

This invention relates to the desulfurization of petroleum fractions. More particularly, it is concerned with the catalytic hydrodesulfurization of fuel oils, especially heavy hydrocarbon oils of the residual type.

The hydrodesulfurization of light petroleum liquids is well-known and has been practiced for several years. The catalytic hydrodesulfurization process of the prior art comprise contacting the sulfur-containing charge stock with a catalyst in the presence of hydrogen at elevated temperatures and pressures to convert the sulfur present in the charge stock to hydrogen sulfide. Ordinarily the hydrogen-rich effluent gas is subjected to a hydrogen sulfide removal treatment and recycled to the reaction zone. Typical catalysts comprise cobalt and molybdenum, nickel and molybdenum or nickel and tungsten on a support such as alumina.

Generally, sulfur is present in petroleum fractions in the form of mercaptans, sulfides, disulfides and in complex ring compounds containing ring structures such as thiophenes. In the catalytic hydrodesulfurization of lighter fractions such as gasoline, naphtha and kerosene, the sulfur is present to a large extent in the form of easily removable mercaptans which require less severe conditions and thus longer catalyst life is obtained. However, in residual fractions not only is the sulfur present in more difficulty removable form, but the fraction contains materials such as tar and metals which severely affect the activity of conventional catalysts.

The catalytic desulfurization of heavy hydrocarbon oils such as crudes and residuals has presented a particular problem to the petroleum-refining industry in that to date commercial desulfurization of heavy hydrocarbon oils by known processes has not been practical. When heavy hydrocarbon oils, for example oils containing at least 1 percent by weight Conradson Carbon Residue, are contacted in a known manner, the catalysts become contaminated by deposited coke, metals and possibly "gum" (polymers) and require higher temperatures to effect satisfactory desulfurization. However, these higher temperatures lead to additional contaminant deposition which results in a rapid deactivation of the catalyst. This deactivation becomes progressively worse and to obtain satisfactory conversion it is necessary to increase the catalyst temperature still higher resulting in more coke and metal deposition thereby deactivating the catalyst within a relatively short time to such an extent that commercial operation is no longer feasible.

The operating severity necessary to obtain the desired desulfurization is dependent on the sulfur content of the charge stock, the desired sulfur content of the product, the type of sulfur compounds in the charge stock and the boiling point distribution of the charge. Unfortunately, when processing a residuum containing charge, the operating conditions necessary for adequate desulfurization frequently are so severe that there is an undesirable amount of conversion to lighter materials boiling below the desired product boiling range. Now, in our process, since sulfur compounds present in distillate stocks such as 650-1,000° F. boiling range distillates are more easily converted to $H_2S$ than are the sulfur compounds present in residua such as 1,000° F.+ vacuum residuum, the distillate stocks are processed at milder conditions such as higher space velocities, low hydrogen partial pressures and/or lower reaction temperatures to obtain the same level of desulfurization as that obtained on residue containing materials.

It has been found advantageous to separate distillable material from wide boiling range stocks such as atmospheric residuum and to process the distillate and the vacuum residuum under different conditions. The separate processing becomes increasingly more advantageous as the ratio of distillates to vacuum residuum increases. By processing the distillate at a higher space velocity or lower reactor pressure or temperature than the total charge or the vacuum residuum, the catalyst volume requirements and the reactor investments costs are lower. Another advantage is that since the heavy metals present in the charge are segregated in the vacuum residuum the catalyst used to process the distillates need not be subjected to heavy metal contamination thereby permitting the use of conventional catalysts. Another advantage is that the lighter portion of the charge is not subjected to the severe-operating conditions prevailing when processing the entire charge stock in one reactor. Still another advantage is that since the lighter materials are not subjected to the severe conditions necessary for the desulfurization of the heavy fraction there is much less undesirable gas formation.

According to the present invention there is provided a process for the production of hydrocarbon oils of reduced sulfur content which comprises subjecting a sulfur containing hydrocarbon oil having a Conradson carbon residue of at least 1 percent by weight and having an initial boiling point between about 650° and 850° F. and an end boiling point in excess of 1,000° F. to distillation under reduced pressure to produce a first fraction boiling below about 1,000° F. and a second fraction boiling above about 1,000° F., contacting said first fraction with a desulfurization catalyst under desulfurization conditions and contacting said second fraction with a desulfurization catalyst under desulfurization conditions more severe than those to which the first fraction is subjected.

In one embodiment of our invention the hydrocarbon oil charge stock such as an atmospheric residuum is introduced into a vacuum tower and a vacuum gas oil having an end point of about 1,000° F. is withdrawn overhead. The vacuum gas oil is then mixed with hydrogen and passed into a gas oil reaction zone where it is contacted at elevated temperature and pressure with a desulfurization catalyst. The still residue or vacuum residuum is withdrawn and is mixed with hydrogen and then passed into a residuum reactor where it is contacted with a desulfurization catalyst having specific properties under more severe conditions such as a higher temperature, a higher pressure or a lower space velocity than is the gas oil fraction.

The process of our invention is used for the treatment of those hydrocarbon oils containing residual material as evidenced by a Conradson Carbon Residue of at least 1 percent by weight. The initial boiling point of the charge stock should be between about 650° and 850° F. and the end boiling point in excess of 1,000° F. Examples of suitable materials are various heavy crudes such as San Ardo, shale oil, tar sand oil, atmospheric residua and the like.

The hydrogen used in the desulfurization reaction should be of a purity of at least about 50 volume percent and preferably has a purity of 75–90 volume percent. Suitable sources of hydrogen are catalytic reformer byproduct hydrogen, electrolytic hydrogen or hydrogen produced by the partial oxidation of a carbonaceous material followed by shift conversion and $CO_2$ removal. Ordinarily, hydrogen is separated from the reaction product and recycled to the reaction zone. If desired, to prevent the buildup of impurities in the recycle hydrogen, a purge stream may be withdrawn from the recycle stream or the recycle hydrogen may be subjected to a purification procedure such as scrubbing for the removal of materials such as $H_2S$ and $NH_3$ which are formed during the desulfurization reaction. It is possible for each reaction zone to have its own hydrogen circulation and purification system or hydrogen may be introduced into each reaction zone from a common hydrogen circulation and purification system. When the hydrogen is recycled, makeup hydrogen is added to the recycle stream to replace that consumed in the desulfurization reactor and also may be added to replace that withdrawn as a purge stream.

The catalyst used for the desulfurization of the vacuum gas oil may comprise a Group VIII metal or compound thereof alone or in admixture with a Group VI metal or compound thereof. Suitable metals are iron, cobalt, nickel, chromium, molybdenum and tungsten. Particularly suitable catalysts comprise mixtures of the oxides or sulfides of nickel and molybdenum, cobalt and molybdenum or nickel and tungsten.

The catalyst should also contain a support composed of a relatively inert refractory inorganic oxide material such as silica, alumina, magnesia, titania, zirconia and the like. Suitable catalysts are composed of from about 2–10 percent cobalt or nickel and 5–40 percent molybdenum or tungsten supported on alumina.

The catalyst used for the desulfurization of the vacuum residuum also comprises a Group VIII metal or compound alone or in conjunction with a Group VI metal or compound or mixtures thereof similar to the catalyst used in the gas oil reactor. However, the catalyst used for the desulfurization of the vacuum residuum should be supported on a material having a surface area of at least 250 m²/g., preferably at least 300 m²/g., and a pore volume of at least 0.6 cc./g. The support should also contain at least 2 percent silica, preferably 2–30 percent. Preferred catalysts are those containing from 2–10 percent, preferably 2–8 percent Group VIII metal such as nickel or cobalt and 5–40 percent, preferably 7–20 percent, Group VI metal such as molybdenum or tungsten. The catalyst may be sulfided prior to use. The catalyst may be used in the form of a slurry or as fixed, moving or fluidized beds. However, a fixed bed is preferred and is used in the further description of the process below.

Surprisingly, the catalyst which is used for the desulfurization of the vacuum residuum and which shows good resistance to deactivation by coke and metal deposition does not have higher desulfurization activity when the charge is a "clean" stock such as a distillate but shows substantially the same desulfurization activity for either distillate or residual charge stocks. For this reason the same catalyst which is used for the desulfurization of the residuum may be used for the desulfurization of the gas oil satisfactorily. However, unless the catalyst has a surface area of at least 250 m.²/g., a pore volume of at least 0.6 cc./g. and a silica content of at least 2 wt. percent, e.g., 2–4 percent it should not be used for residuum desulfurization. Thus, a catalyst which is suitable for use in the desulfurization of the residuum may be used satisfactorily for the desulfurization of the gas oil but it does not follow that any catalyst suitable for the desulfurization of gas oil is satisfactory for residuum desulfurization.

One advantage in the use of the same catalyst in both reaction zones is that if an upset were to occur in the operation of the vacuum tower permitting a charge containing residual material to be sent to the gas oil reactor, the catalyst would not be deactivated by the coke and metal deposition as would a conventional catalyst.

The desulfurization of the gas oil is carried out at a catalyst bed temperature of 450°–900° F., preferably 500°–800° F. The hydrogen partial pressure may range from 300–3,000 p.s.i.a. although pressures of 500–1,500 are preferred. A space velocity of 0.1–20 v./v./hr. may be used although for commercial units the space velocity will generally range between 0.5 and 10.0 v./v./hr. Hydrogen should be circulated through the reactor at a rate of at least 500 s.c.f./bbl., preferably 1,000–5,000 s.c.f./bbl. For the desulfurization of the vacuum residuum temperatures of 600°–900° F., preferably 650°–850° F. may be used. The hydrogen partial pressure may range between 500 and 3,000 p.s.i.a., a range of 1000–2,000 being preferred. Hydrogen rates of 1,000–2,000 s.c.f./bbl., preferably 3,000–10,000 s.c.f./bbl. may be used. The space velocity may range from 0.1–10 v./v./hr., a preferred range being 0.3–1.5. As pointed out above, conditions for the desulfurization of the vacuum residuum should be more severe than the conditions for the desulfurization of the vacuum gas oil.

In a more specific embodiment of the invention, the charge stock, for example, an atmospheric residuum, is fractionated under reduced pressure to product a light vacuum gas oil, a heavy vacuum gas oil and a residuum fraction. The heavy vacuum gas oil is mixed with hydrogen and introduced into the upper portion of a bed of the desulfurization catalyst. The mixture is charged preferably downflow through the reactor wherein, due to the hydrogen consuming reactions involved, the temperature increases. The light gas oil fraction is also mixed with hydrogen and is introduced into the gas oil reactor at an intermediate point and at a temperature such that the temperature of the reactant stream passing through the reaction zone is reduced to the desired level whereby the mixture of light gas oil and hydrogen acts as a temperature control agent. Since the sulfur compounds in the light gas oil are more easily decomposed than those in the heavy gas oil, effective desulfurization of the light gas oil takes place although it passes through only a portion of the catalyst bed. The heavy gas oil which contains more stable sulfur containing compounds is thus subjected to a lower space velocity than the light gas oil. The vacuum residuum is mixed with hydrogen and is passed through its own reaction zone.

In still another embodiment of the present invention the charge stock is separated into a vacuum gas oil and a vacuum residuum, the vacuum residuum is introduced with hydrogen into the upper end of a vacuum residuum reactor and passed downwardly through the catalyst bed. The gas oil is also mixed with hydrogen and the mixture introduced into an intermediate point of the vacuum residuum reactor at such a temperature as to control the temperature of the downflowing reactant stream within a desired range. The vacuum gas oil flows downwardly through the reactor with the vacuum residuum and is effectively desulfurized therein. The vacuum gas oil is subject to less severe conditions than the residuum in that the vacuum gas oil has a much higher space velocity with respect to the catalyst than does the vacuum residuum. In this way, the gas oil acts as a temperature control agent in addition to being effectively desulfurized at conditions less severe than is the residuum, The following example is given for illustrative purposes only.

In this example, the charge stock, an atmospheric residuum obtained from Arabian Crude is distilled at reduced pressure to yield 55 volume percent of a vacuum gas oil having an API Gravity of 19.8° and a sulfur content of 2.5 wt. percent and 45 volume percent of a vacuum residuum having an API Gravity of 9.4°, a sulfur content of 3.8 wt. percent, a Conradson Carbon Residue of 19.8 wt. percent, a nickel content of 53 p.p.m., a vanadium content of 93 p.p.m. and an iron content of 10 p.p.m.

The vacuum residuum is contacted with a catalyst having the following characteristics:

| | |
|---|---|
| Surface area, m.²/g. | 312 |
| Pore volume, cc./g. | 0.66 |
| Cobalt, wt. % | 2.1 |
| Molybdenum, wt. % | 11.0 |
| Silica, wt. % | 4.0 |
| Alumina | Remainder | at the following conditions:

| | |
|---|---|
| Average bed temperature, °F. | 725 |
| Hydrogen partial pressure, p.s.i.a. | 1,800 |
| Space velocity, v./v./hr. | 0.5 |
| Hydrogen rate, SCFB | 10,000 |
| Hydrogen purity, vol. % | 90 |

The vacuum gas oil is introduced into the catalyst bed at an intermediate point in the reaction zone at a rate such that it passes through the balance of the catalyst bed at a space velocity of 1.0.

The API gravities and sulfur contents of the total product and the separated vacuum gas oil and vacuum residuum are as follows:

| | Total Product | Gas Oil | Residuum |
|---|---|---|---|
| Gravity, °API | 19.7 | 25.5 | 13.1 |
| Sulfur, wt. % | 0.84 | 0.35 | 1.4 |

It is also possible to separate the atmospheric residuum into several fractions and desulfurize the lighter fractions under less severe conditions than the heavier fractions. This can be done by desulfurizing each fraction in a separate reactor and varying the reaction conditions such as temperature, pressure and space velocity or it can be done by charging more than one fraction to a reactor, the lightest fraction charged to any one reactor being introduced into that reactor closer to the outlet than any heavier fraction introduced into the reactor. In this latter case, only the space velocity is varied.

Various other modifications of the invention as hereinbefore set forth may be made without departing from the spirit and scope thereof and therefore only such limitations are imposed as are indicated in the appended claims.

1. A process for the production of hydrocarbon oils of reduced sulfur content which comprises subjecting a sulfur-containing atmospheric residuum having an initial boiling point between about 650° F. and 850° F. and an end boiling point in excess of 1,000° F. to distillation under subatmospheric pressure to produce a vacuum gas oil boiling below about 1,000° F. and a vacuum residuum boiling above about 1,000° F. said vacuum residuum having a higher sulfur content than said vacuum gas oil, contacting said vacuum residuum in a first desulfurization zone with hydrogen and with a desulfurization catalyst comprising a Group VIII metal and a Group VI metal or sulfides thereof on an alumina-silica support containing 2–4 wt. percent silica, having a surface area of at least 250 m$^2$/g. and a pore volume of at least 0.6 cc./g. at a temperature between 600° and 900° F., a pressure between 500 and 3,000 p.s.i.a., a space velocity between 0.3 and 1.5 v./v./hr., and a hydrogen rate between 3,000 and 10,000 s.c.f./bbl., mixing the effluent from said first desulfurization zone with said vacuum gas oil and contacting the resulting mixture at a temperature below the temperature of said effluent from said first zone at a temperature between 500° and 800° F. with said desulfurization catalyst at a pressure between 300 and 3,000 p.s.i.a. and a space velocity between 0.5 and 10 v./v./hr. and recovering the desulfurized resulting mixture as a product of said process.

2. The process of claim 1 in which the desulfurization catalyst comprises nickel and tungsten.

3. The process of claim 1 in which the desulfurization catalyst comprises nickel and molybdenum.

4. The process of claim 1 in which the desulfurization catalyst comprises cobalt and molybdenum.

* * * * *

PO-1050
(5/69)

UNITED STATES PATENT OFFICE
CERTIFICATE OF CORRECTION

Patent No. 3,617,526               Dated  November 2, 1971

Inventor(s) William R. Coons, Jr., Gerald V. Nelson and Glenn C. Wray

It is certified that error appears in the above-identified patent and that said Letters Patent are hereby corrected as shown below:

Claims 2, 3 and 4, lines 1 and 2 "desulfurization catalyst comprises" should read --vacuum residuum is contacted with a desulfurization catalyst comprising--

Signed and sealed this 10th day of October 1972.

(SEAL)
Attest:

EDWARD M. FLETCHER, JR.                ROBERT GOTTSCHALK
Attesting Officer                       Commissioner of Patents